J. HILLS.
Faucet.

No. 222,994. Patented Dec. 30, 1879.

Witnesses
S. N. Piper
W. W. Lunt

Inventor
Jacob Hills
by attorney
R. H. Eddy

UNITED STATES PATENT OFFICE.

JACOB HILLS, OF HAYDENVILLE, MASSACHUSETTS.

IMPROVEMENT IN FAUCETS.

Specification forming part of Letters Patent No. 222,994, dated December 30, 1879; application filed November 6, 1879.

*To all whom it may concern:*

Be it known that I, JACOB HILLS, of Haydenville, of the county of Hampshire, of the State of Massachusetts, have invented a new and useful Improvement in Faucets; and I do hereby declare the same to be described in the following specification and represented in the accompanying drawings, of which—

Figure 1:
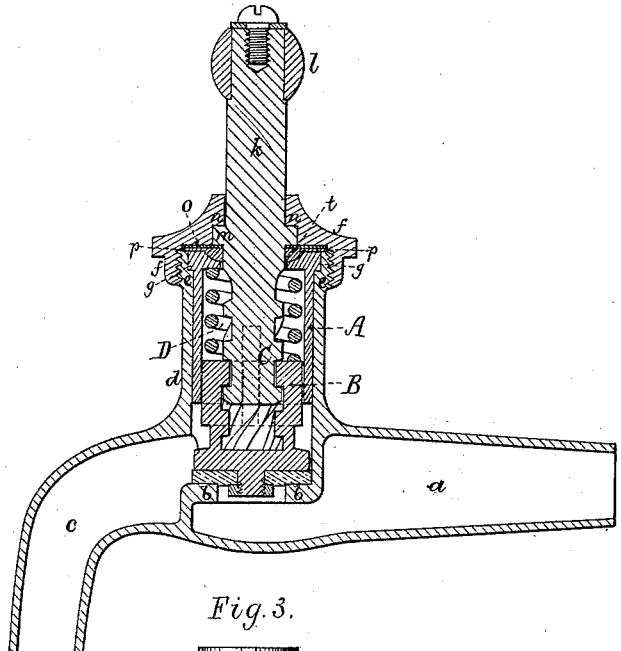
Figure 2:
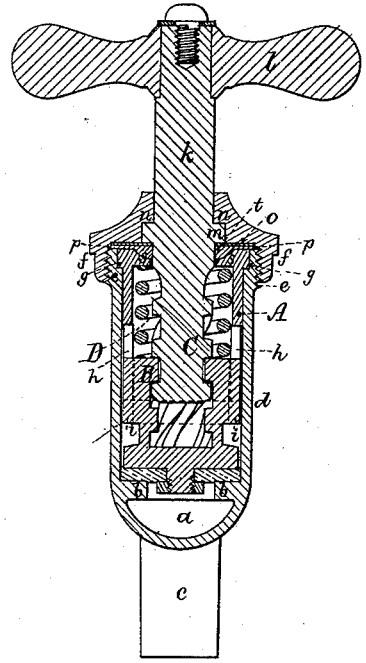
Figure 3:
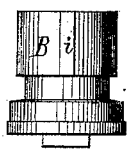
Figure 4:
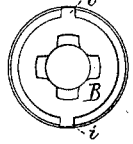
Figure 5:
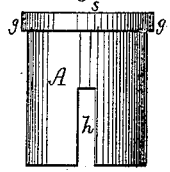
Figure 6:
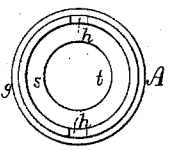
Figure 7:
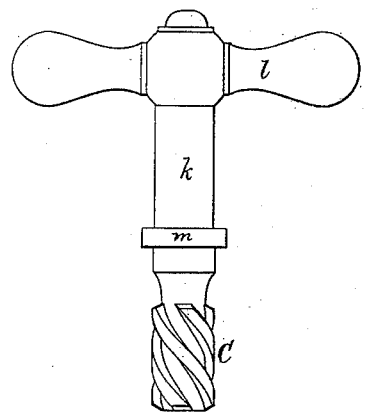

Figure 1 is a longitudinal section, and Fig. 2 a transverse section, of a faucet provided with my improvement, which relates to what are usually termed "self or automatically closing faucets." Fig. 3 is a side view, and Fig. 4 a top view, of its piston-valve. Fig. 5 is a side view, and Fig. 6 a bottom view, of the valve supporting and guiding sleeve. Fig. 7 is a side view of the valve-operative four-threaded screw with its shank and handle and supporting-flange.

The nature of my improvement is defined in the claim hereinafter presented.

In the faucet shown by such drawings the induct $a$ is arranged to extend beneath the valve-seat $b$, and the educt $c$ leads out of the body $d$ and above the said seat. The said body is open at top, and there has a screw, $e$, for engaging with the cover or cap $f$. Furthermore, the body, at its upper end, is rabbeted to receive the flange $g$ at the upper end or head, $s$, of the valve guide-sleeve A. The said sleeve is open at its lower end and closed at its upper end, except in having an opening in its head, as shown at $t$, sufficient to receive the shank of the valve-screw. Furthermore, the sleeve has slots $h\ h$ made in it lengthwise of it and opening out of it at its lower end, such slots being to receive ears $i\ i$, extending from the valve B.

The valve-operative screw C, which in this case is a four-threaded one, screws into the body of the valve, and its shank $k$ is provided with a handle, $l$, and also with a flange, $m$, arranged in manner as shown. The flange enters a correspondingly-shaped recess, $n$, in the cap $f$, and with a metallic washer, $o$, arranged as shown, serves, when the cap is screwed down firmly upon the body of the faucet, to prevent the screw from having motion lengthwise of it, though admitting it to be revolved by its handle to raise the valve, and in the opposite way by a helical spring, D, to cause the valve to be depressed upon its seat. The said spring is arranged within the sleeve A, and encompasses the screw C, and bears against the upper end of the valve, and at top against the sleeve-head, which rests against an elastic washer, $p$, arranged in the cap, and between the metallic washer therein and the top of the body of the faucet.

The cap, on being screwed down, bears the washer against the top of the valve guide-sleeve, and, besides operating to make a close joint, aids in preventing the sleeve from being revolved in the body.

The screw thread or threads should have a pitch which will enable and cause the screw to be revolved backward by the retractive power of the spring. The spring thus serves to so operate the screw as to cause the valve to be automatically returned to and forced down upon its seat after the handle may have been relieved of the force applied to it to effect the raising of the valve off its seat.

The expansive power of the spring should not only be sufficient to overcome any ordinary pressure of water under the valve tending to force it upward off its seat, but, on the valve being raised by its four-threaded screw, such expansive force should be capable of overcoming the resistance of the screw, and of depressing the valve to its seat on the handle being relieved from the pressure of the hand of the operator.

The slotted sleeve not only performs the office of guiding the valve, but that of inclosing the spring in a manner to prevent or aid in preventing it from being clogged by any extraneous matter or matters that might, in passing the valve, become caught in the spring.

In carrying out my present invention, I have combined with the kind of self-closing faucet shown in the United States Patent No. 118,012 the flanged guide-sleeve represented in the Patent No. 208,313, granted to me for an improvement in stop-cocks. In so doing I not only secure to the self-closing faucet the advantages of the sleeve so far as it relates to the valve and the operative screws thereof, but the additional advantage of the spring acting to firmly force the sleeve-head upward against the yielding washer directly over it, so as thereby to make or greatly aid in securing a close joint, to prevent escape of water upward between the inner edge of the washer and the part of the screw-shank surrounded thereby.

The screw-cap operates to clamp the yielding washer on the upper edge of the body of the faucet, while the head of the guide-sleeve, by being forced upward by the spring, operates to compress the washer so as to maintain a close joint around the shank of the screw. Therefore, In the self-closing faucet, I claim—

In combination with the screw-cap $f$ and yielding washer $p$, applied to the body $d$ and shank $k$ in manner essentially as set forth, and with the sleeve A, having a head, as represented, the spring D, arranged within the said sleeve and around the shank, and to bear on the valve B and against the sleeve, so as to force its head upward against the washer, in order to compress the said washer, and thereby form or aid in forming a close joint around the shank, as explained.

JACOB HILLS.

Witnesses:
C. J. HILLS,
T. H. IVES.